(12) United States Patent
Dolgov (10) Patent No.: US 9,120,485 B1
(45) Date of Patent: Sep. 1, 2015

(54) METHODS AND SYSTEMS FOR SMOOTH TRAJECTORY GENERATION FOR A SELF-DRIVING VEHICLE

(75) Inventor: Dmitri Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 198 days.

(21) Appl. No.: 13/616,813

(22) Filed: Sep. 14, 2012

(51) Int. Cl.
*B60W 30/10* (2006.01)
*B62D 15/02* (2006.01)

(52) U.S. Cl.
CPC ............ *B60W 30/10* (2013.01); *B62D 15/025* (2013.01)

(58) Field of Classification Search
CPC ............................. B60W 30/10; B62D 15/025
USPC ................... 701/23, 25, 26, 411, 423
See application file for complete search history.

(56) References Cited

U.S. PATENT DOCUMENTS

| | | | |
|---|---|---|---|
| 6,675,074 B2 | 1/2004 | Hathout et al. | |
| 7,865,277 B1 | 1/2011 | Larson et al. | |
| 7,979,158 B2 | 7/2011 | Sladek et al. | |
| 8,060,239 B2 | 11/2011 | Hoffmann et al. | |
| 8,082,102 B2 * | 12/2011 | Ravenscroft | 701/23 |
| 8,126,594 B2 | 2/2012 | Hong et al. | |
| 8,510,041 B1 * | 8/2013 | Anguelov et al. | 701/445 |
| 2008/0243307 A1 | 10/2008 | Toussaint et al. | |
| 2010/0076640 A1 | 3/2010 | Maekawa et al. | |
| 2010/0082194 A1 | 4/2010 | Yabushita et al. | |
| 2011/0035086 A1 | 2/2011 | Kim et al. | |
| 2011/0208429 A1 | 8/2011 | Zheng et al. | |
| 2011/0297070 A1 | 12/2011 | Riggs et al. | |
| 2012/0283907 A1 * | 11/2012 | Lee et al. | 701/31.9 |
| 2013/0253793 A1 * | 9/2013 | Lee et al. | 701/70 |
| 2013/0304300 A1 * | 11/2013 | Peake et al. | 701/23 |

OTHER PUBLICATIONS

Delingette et al., Trajectory Generation with Curvature Constraint Based on Energy Minimization, The Robotics Institute at Carnegie Mellon University Jan. 1, 1991.
A. Gasparetto et al., A New Method for Smooth Trajectory Planning of Robot Manipulators, Mechanism and Machine Theory 42 (2007) pp. 455-471.

* cited by examiner

*Primary Examiner* — John Q Nguyen
*Assistant Examiner* — Anshul Sood
(74) *Attorney, Agent, or Firm* — McDonnell Boehnen Hulbert & Berghoff LLP (57) ABSTRACT

A vehicle configured to operate in an autonomous mode is provided. The vehicle is configured to follow a baseline trajectory. Changes to the baseline trajectory are received by a computer system associated with the vehicle. The computer system creates a function representing the current trajectory of the vehicle, as well as one or more functions defining any desired trajectory criteria, and generates an optimization problem from the functions, which, when solved, provide a new trajectory for the vehicle to follow that moves efficiently and smoothly toward the changed baseline trajectory.

18 Claims, 7 Drawing Sheets

Top View

METHODS AND SYSTEMS FOR SMOOTH TRAJECTORY GENERATION FOR A SELF-DRIVING VEHICLE

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically follows a baseline trajectory to remain on or near the center of a road lane.

SUMMARY

In a first aspect, a method is provided. The method includes controlling, using a computer system, a vehicle in an autonomous mode to follow a first trajectory. The method further includes receiving data indicating a second trajectory. A plurality of vertices are defined based on the first trajectory. The method further includes defining a first set of cost functions for the plurality of vertices, wherein each cost function in the first set assigns to a respective vertex in the plurality of vertices a respective cost based on a distance from the respective vertex to the second trajectory. The method further includes defining a second set of cost functions for the plurality of vertices, wherein each cost function in the second set assigns to a respective vertex in the plurality of vertices a respective cost based on at least one other criterion, and optimizing the vertices based on at least the costs assigned by the first set of cost functions and the second set of cost functions. The method then includes determining a transitional trajectory based on the optimized vertices, wherein the transitional trajectory transitions from the first trajectory to the second trajectory, and controlling the vehicle in the autonomous mode to follow the transitional trajectory.

In a second aspect, a vehicle is provided. The vehicle includes a computer system. The vehicle is configured to operate in an autonomous mode. The computer system is configured to define a plurality of vertices based on the first trajectory. The computer system is further configured to define a first set of cost functions for the plurality of vertices, wherein each cost function in the first set assigns to a respective vertex in the plurality of vertices a respective cost based on a distance from the respective vertex to the second trajectory, to define a second set of cost functions for the plurality of vertices, wherein each cost function in the second set assigns to a respective vertex in the plurality of vertices a respective cost based on at least one other criterion, and to optimize the vertices in the plurality of vertices based on at least the costs assigned by the first set of cost functions and the second set of cost functions. The computer system is configured to determine a transitional trajectory based on the optimized vertices, wherein the transitional trajectory transitions from the first trajectory to the second trajectory, and to control the vehicle in the autonomous mode to follow the transitional trajectory.

In a third aspect, a non-transitory computer readable medium having stored instructions is provided. The instructions are executable by a computer system to cause the computer system to perform functions. The functions include controlling a vehicle in an autonomous mode to follow a first trajectory. The functions further include receiving data indicating a second trajectory. A plurality of vertices are defined based on the first trajectory. The functions further include defining a first set of cost functions for the plurality of vertices, wherein each cost function in the first set assigns to a respective vertex in the plurality of vertices a respective cost based on a distance from the respective vertex to the second trajectory, defining a second set of cost functions for the plurality of vertices, wherein each cost function in the second set assigns to a respective vertex in the plurality of vertices a respective cost based on at least one other criterion, and optimizing the vertices in the plurality of vertices based on at least the costs assigned by the first set of cost functions and the second set of cost functions. The functions further include determining a transitional trajectory based on the optimized vertices, wherein the transitional trajectory transitions from the first trajectory to the second trajectory, and controlling the vehicle in the autonomous mode to follow the transitional trajectory.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure relates to apparatuses and methods for transportation to destinations by a self-driving vehicle configured to follow a baseline trajectory. Changes to the baseline trajectory are received by a computer system associated with the vehicle. The computer system may then create a function representing the current trajectory of the vehicle, as well as one or more functions defining any desired trajectory criteria, and generate an optimization problem from the functions, which, when solved, provide a new, transitional trajectory for the vehicle to follow that moves efficiently and smoothly toward the changed baseline trajectory.

Some methods disclosed herein may be carried out in part or in full by a vehicle configured to operate in an autonomous mode with or without external interaction (e.g., such as from a user of the vehicle). Other methods disclosed herein may be carried out in part or in full by a server. In example embodiment, a server may receive data from the vehicle, from a user input, and/or from one or more sensors observing one or more aspects of an environment of a vehicle. In some embodiments, the sensor data could be transmitted to the server using a wireless communication system. Other interactions between a vehicle operating in an autonomous mode and a server are possible within the context of the disclosure.

Also disclosed herein are non-transitory computer readable media with stored instructions. The instructions could be executable by a computing device to cause the computing device to perform functions similar to those described in the methods described below.

Figure 1:
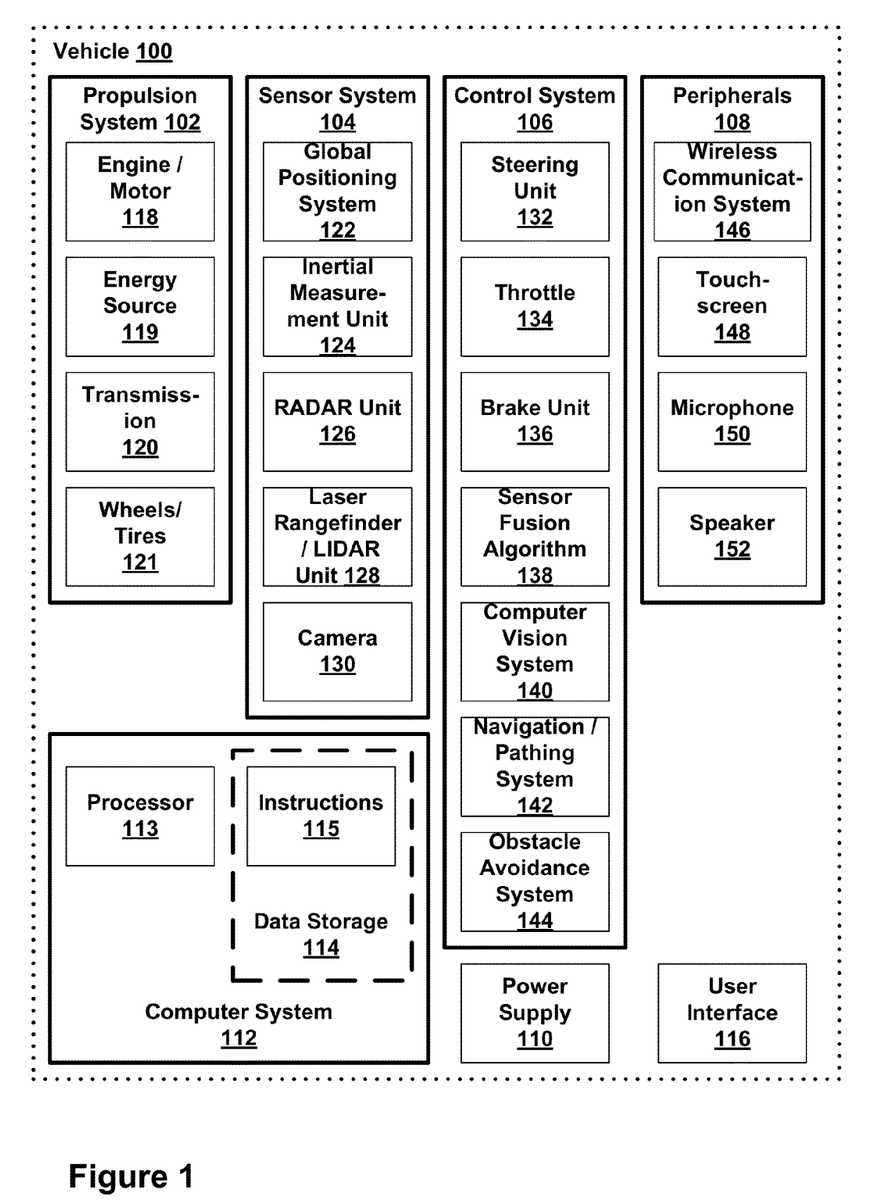
FIG. 1 is a functional block diagram illustrating a vehicle in accordance with an example embodiment.

FIG. 1 is a functional block diagram illustrating a vehicle 100 in accordance with an example embodiment. The vehicle 100 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 100 may be configured to operate fully or partially in an autonomous mode. For example, the vehicle 100 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 100 based on the determined information. While in autonomous mode, the vehicle 100 may be configured to operate without human interaction.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components or combined into fewer functional or physical components. In some further examples, additional functional and physical components may be added to the examples illustrated by FIG. 1.

The propulsion system 102 may include components operable to provide powered motion for the vehicle 100. In an example embodiment, the propulsion system 102 may include an engine 118, an energy source 119, a transmission 120, and wheels 121. The engine 118 may be any combination of an internal combustion engine, an electric motor, steam engine, Stirling engine, or other types of engines or motors. In some example embodiments, the engine 118 may be configured to convert energy source 119 into mechanical energy. In some example embodiments, the propulsion system 102 may include multiple types of engines or motors. For instance, a gas-electric hybrid car could include a gasoline engine and an electric motor. Other examples are possible.

The energy source 119 may represent a source of energy that may, in full or in part, power the engine 118. That is, the engine 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, or flywheels. The energy source 119 may also provide energy for other systems of the vehicle 100.

The transmission 120 may include elements that are operable to transmit mechanical power from the engine 118 to the wheels 121. To this end, the transmission 120 could include a gearbox, a clutch, a differential, and drive shafts. The transmission 120 may include other elements. The drive shafts may include one or more axles that could be coupled to the one or more wheels 121.

The wheels 121 of the vehicle 100 may be tires. The wheels 121 of the vehicle 100 may be configured in various formats, including a unicycle, bicycle, tricycle, or a four-wheel format, such as on a car or a truck, for example. Other wheel geometries are possible, such as those including six or more wheels. Any combination of the wheels 121 of vehicle 100 may be operable to rotate differentially with respect to other wheels 121. The wheels 121 may represent at least one wheel that is fixedly attached to the transmission 120 and at least one tire coupled to a rim of the wheel that could make contact with the driving surface. The wheels 121 may include a combination of metal and rubber, or another combination of materials.

The sensor system 104 may include a number of sensors configured to sense information about an environment of the vehicle 100. For example, the sensor system 104 may include a Global Positioning System (GPS) 122, an inertial measurement unit (IMU) 124, a RADAR unit 126, a laser rangefinder/LIDAR unit 128, and a camera 130. The sensor system 104 may also include sensors configured to monitor internal systems of the vehicle 100 (e.g., an $O_2$ monitor, a fuel gauge, an engine oil temperature). Other sensors are possible as well.

One or more of the sensors included in the sensor system 104 may be configured to be actuated separately or collectively in order to modify a position, an orientation, or both, of the one or more sensors.

The GPS 122 may be any sensor configured to estimate a geographic location of the vehicle 100. To this end, the GPS 122 may include a transceiver operable to provide information regarding the position of the vehicle 100 with respect to Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and the heading of the objects.

Similarly, the laser rangefinder or LIDAR unit 128 may be any sensor configured to sense objects in the environment in which the vehicle 100 is located using lasers. In an example embodiment, the laser rangefinder/LIDAR unit 128 may include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment of the vehicle 100. The camera 130 may be a still camera or a video camera.

The control system 106 may be configured to control operation of the vehicle 100 and its components. Accordingly, the control system 106 may include various elements such as a steering unit 132, a throttle 134, a brake unit 136, a sensor fusion algorithm 138, a computer vision system 140, a navigation/pathing system 142, and an obstacle avoidance system 144.

The steering unit 132 may represent any combination of mechanisms that may be operable to adjust the heading of vehicle 100.

The throttle 134 may be configured to control, for instance, the operating speed of the engine 118 and, in turn, control the speed of the vehicle 100.

The brake unit 136 could include any combination of mechanisms configured to decelerate the vehicle 100. The brake unit 136 could use friction to slow the wheels 121. In other embodiments, the brake unit 136 may convert the kinetic energy of the wheels 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, a Bayesian network, or other algorithm. The sensor fusion algorithm 138 may further provide various assessments based on data from the sensor system 104. In an example embodiment, the assessments may include evaluations of individual objects or features in the environment of the vehicle 100, evaluation of a particular situation, and evaluate possible impacts based on the particular situation. Other assessments are possible.

The computer vision system 140 may be any system operable to process and analyze images captured by the camera 130 in order to identify objects or features in the environment of the vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path or route for the vehicle 100. The navigation and pathing system 142 may additionally be configured to update the driving path dynamically while the vehicle 100 is in operation. In some embodiments, the navigation and pathing system 142 may be configured to incorporate data from the sensor fusion algorithm 138, the GPS 122, and one or more predetermined maps so as to determine the driving path for the vehicle 100.

The obstacle avoidance system 144 may represent a control system configured to identify, evaluate, and avoid or otherwise negotiate potential obstacles in the environment of the vehicle 100.

The control system 106 may additionally or alternatively include components other than those shown and described.

Peripherals 108 may be configured to allow interaction between the vehicle 100 and external sensors, other vehicles, other computer systems, and/or a user. For example, the peripherals 108 may include a wireless communication system 146, a touchscreen 148, a microphone 150, and a speaker 152.

In an example embodiment, the peripherals 108 may provide, for instance, means for a user of the vehicle 100 to interact with the user interface 116. To this end, the touchscreen 148 may provide information to a user of the vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to a user of the vehicle 100.

In one example, the wireless communication system 146 may be configured to wirelessly communicate with one or more devices directly or via a communication network. For example, the wireless communication system 146 could use 3G cellular communication, such as CDMA, EVDO, GSM/GPRS, or 4G cellular communication, such as WiMAX or LTE. Alternatively, the wireless communication system 146 may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system 146 may include one or more dedicated short range communications (DSRC) devices that may include public or private data communications between vehicles and/or roadside stations.

The power supply 110 may provide power to various components of the vehicle 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and the energy source 119 could be implemented together, as in some all-electric cars.

Many or all of the functions of the vehicle 100 could be controlled by the computer system 112. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 at during the operation of the vehicle 100 in the autonomous, semi-autonomous, and/or manual modes.

The vehicle 100 may include a user interface 116 for providing information to or receiving input from a user of the vehicle 100. The user interface 116 may control or enable control of content and the layout of interactive images that may be displayed on the touchscreen 148. Further, the user interface 116 may include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. In an example embodiment, the computer system 112 could be operable to provide control over many aspects of the vehicle 100 and its subsystems.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired or wireless fashion.

Figure 2:
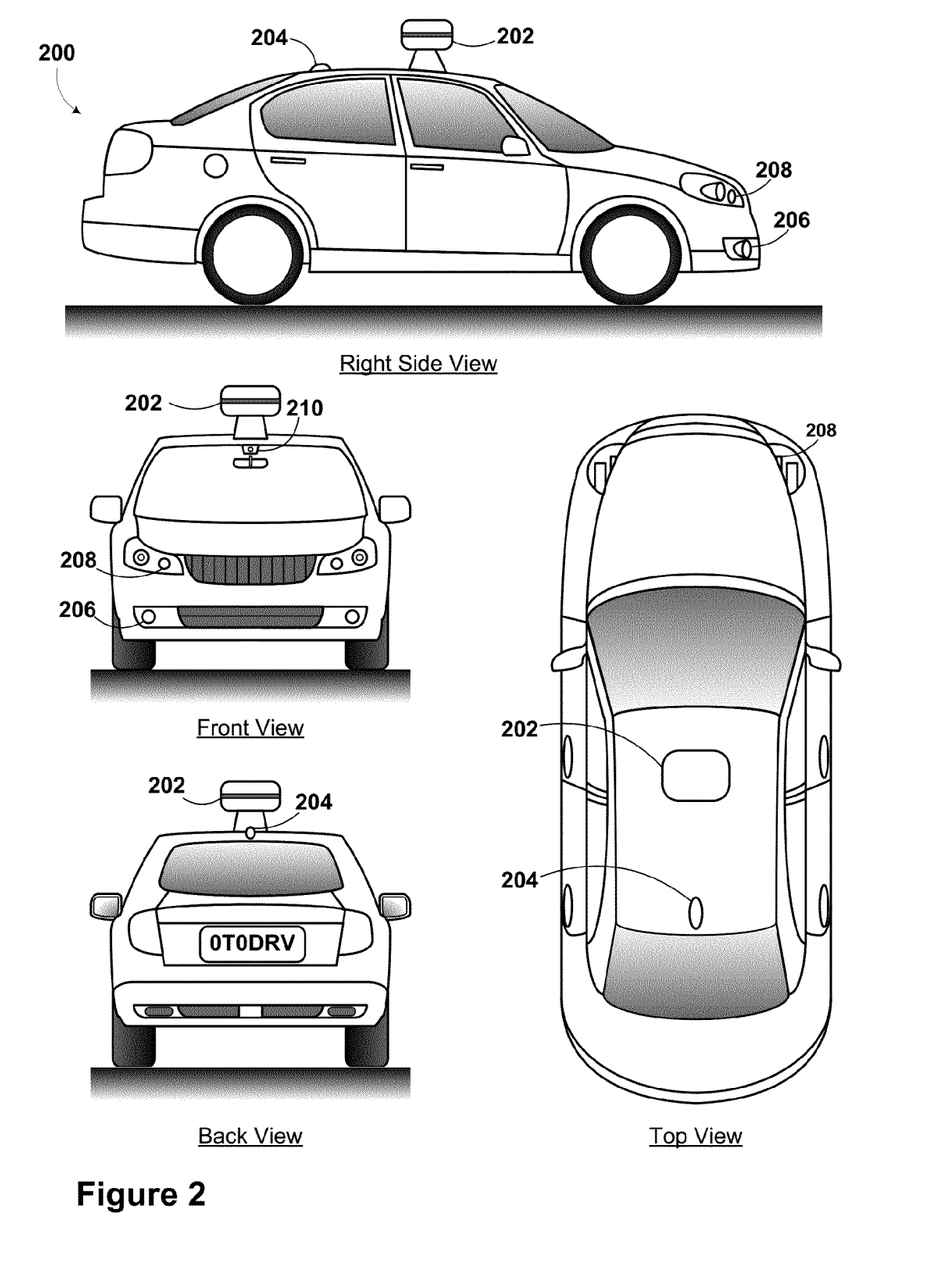
FIG. 2 illustrates a vehicle in accordance with an example embodiment.

FIG. 2 is a vehicle 200 in accordance with an example embodiment. FIG. 2 shows a vehicle 200 that could be similar or identical to the vehicle 100 described in reference to FIG. 1. Although the vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

In some embodiments, the vehicle 200 includes a sensor unit 202, a wireless communication system 204, a LIDAR unit 206, a laser rangefinder unit 208, and a camera 210. The vehicle 200 may include some or all of the elements described with reference to FIG. 1.

The sensor unit 202 may include one or more different sensors configured to capture information about an environment surrounding the vehicle 200. For example, sensor unit 202 could include any combination of cameras, RADARs, LIDARs, range finders, and acoustic sensors. Other types of sensors are possible. In an example embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 may be located on a roof of the vehicle 200, as depicted in FIG. 2. Alternatively, the wireless communication system 204 may be located, fully or in part, elsewhere. The wireless communication system 204 may include wireless transmitters and receivers that could be configured to communicate with devices external or internal to the vehicle 200. Specifically, the wireless communication system 204 may include transceivers configured to communicate with other vehicles or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of the spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern, and uses the camera 210 to detect a reflection of the predetermined light pattern off the object. Based on distortions in the reflected light pattern, the vehicle 200 may determine the distance to the points on the object. The predetermined light pattern may comprise infrared light, or light of another wavelength. As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object. As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 may be mounted inside a front windshield of the vehicle 200. Specifically, as illustrated, the camera 210 could capture images from a forward-looking view with respect to the vehicle 200. Other mounting locations and viewing angles of camera 210 are possible, either inside or outside the vehicle 200.

The camera 210 may have associated optics that could be operable to provide an adjustable field of view. Further, the camera 210 may be mounted to the vehicle 200 with a movable mount that could be operable to vary a pointing angle of the camera 210.

Within the context of the present disclosure, the components of the vehicle 100 and the vehicle 200 may be configured to work in an interconnected fashion with other components within or outside their respective systems.

Several example implementations will now be described herein. It will be understood that there are many ways to implement the devices, systems, and methods disclosed herein. Accordingly, the following examples are not intended to limit the scope of the present disclosure.

In the manual and semi-autonomous modes, a vehicle is driven entirely and partially, respectively, by a user. In contrast, in a fully autonomous mode, a vehicle, such as the vehicle 100 or the vehicle 200 with reference to FIGS. 1 and 2, for example, is controlled by a computer system to be driven with little or no user interaction.

Figure 3A:
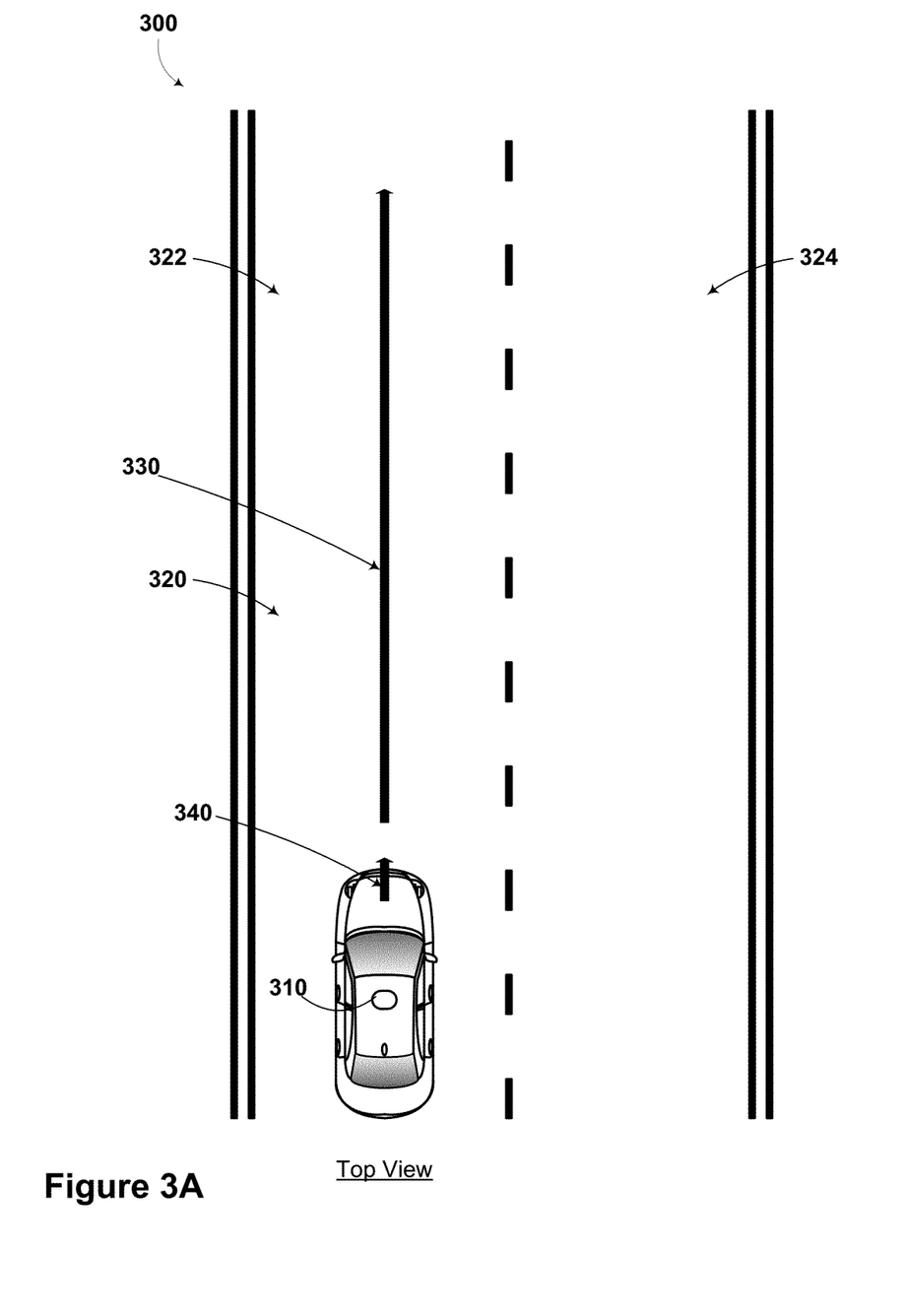
FIG. 3A is a schematic illustrating an autonomous vehicle operating scenario in accordance with an example embodiment.

FIG. 3A is a schematic illustrating an autonomous vehicle operating scenario 300 in accordance with an example embodiment. In scenario 300, a vehicle 310 is driving on a road 320 in the autonomous mode. The road 320 in FIG. 3A comprises two lanes, a left lane 322 and a right lane 324. As shown in FIG. 3A, the portion of the road 320 is straight and there are no obstacles or objects present on the road 322.

The vehicle 310 may be configured to follow a trajectory 330 in the autonomous mode. In FIG. 3A the trajectory 330 is shown as being positioned in the center of the left lane 322 of the road 320. The trajectory 330 indicates an estimate of the route the vehicle 310 should follow. The trajectory 330 may be a periodic input into a computer system of the vehicle 330, and may change based on a number of factors. Sensors, such as sensor system 104 of FIGS. 1 and 2, may be configured to sense information about an environment of the vehicle 310. The information received by the computer system from the sensors may be used to determine an estimate the center of a road lane or an object detected about the environment of the vehicle 310, for example. This information, in turn, may be used to update the trajectory 330.

A path 340 is the route the vehicle 310 is currently driving. Although the vehicle 310 is configured to follow the trajectory 330, the path 340 may not match the trajectory 330. The path 340 may not match the trajectory 330 due to a number of reasons. For example, the estimate of the trajectory 330 may be noisy or may be frequently changing, making it difficult for the vehicle 310 to follow the trajectory 330 smoothly and precisely.

Figure 3B:
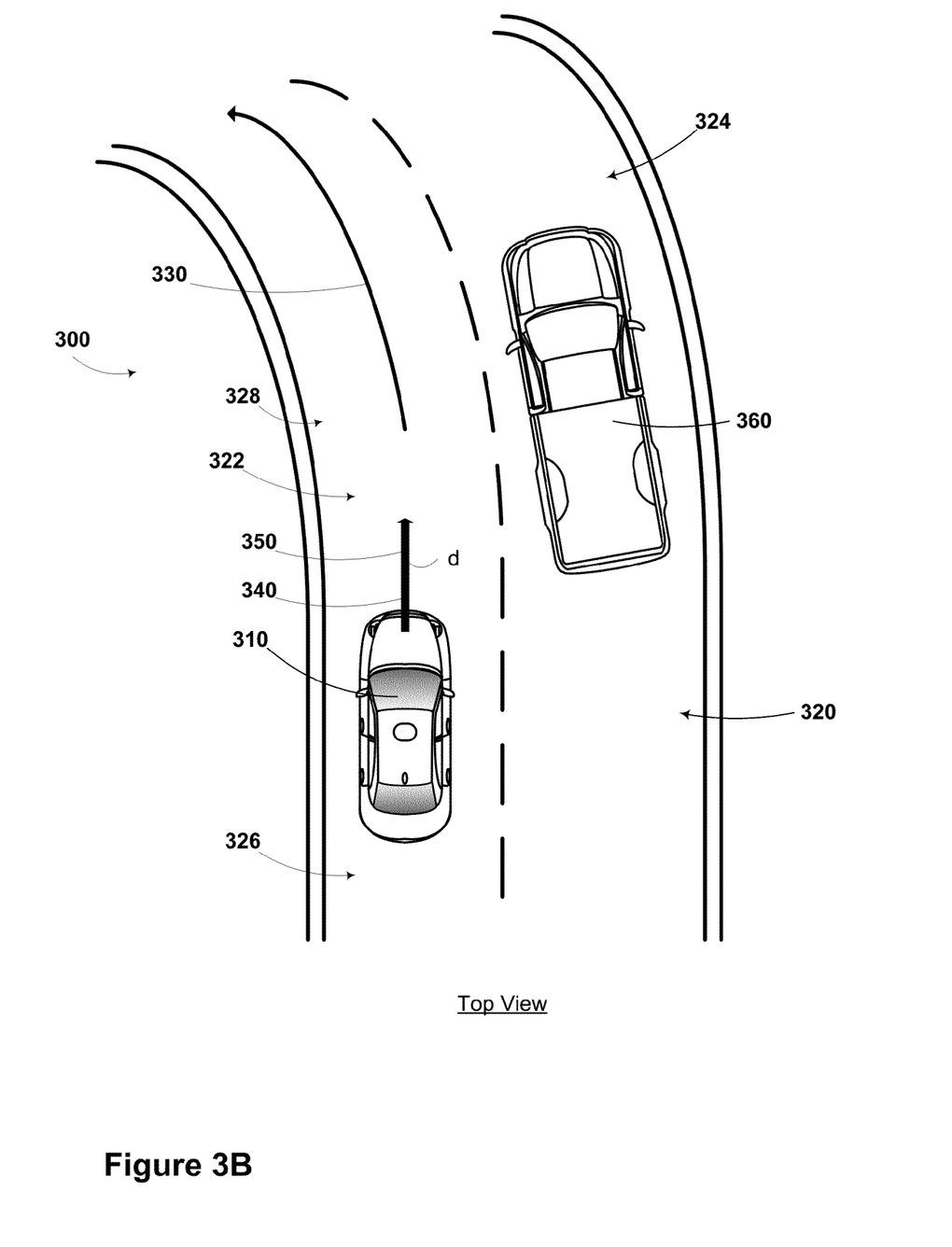
FIG. 3B is a schematic further illustrating the autonomous vehicle operating scenario of FIG. 3A.

FIG. 3B is a schematic further illustrating the autonomous vehicle operating scenario 300 of FIG. 3A. In FIG. 3B, the road 320 transitions from a straight portion 326 to a curved portion 328. Furthermore, another object may be detected on the road 322: a vehicle 360 in the right lane 324. The computer system of the vehicle 310 may receive information or data indicating the curved portion 328 of the road 320 and the vehicle 360, and may update the trajectory 330 accordingly. More specifically, in one example, the computer system of the vehicle 310 may receive information indicating a change in the estimate of the center of the left road lane 322, and may responsively update the trajectory 330 to follow the changed estimate. Thus, as shown in FIG. 3B, the trajectory 330 curves over the curved portion 328 of the road 320 so as to remain substantially in the center of the left lane 324 and to avoid hitting the vehicle 360.

In response to the update to the trajectory 330, the vehicle 310 may update its path 340 so as to continue following the trajectory 330. If the vehicle 310 moves too quickly from the path 340 to match the trajectory 330, however, a passenger within the vehicle 310 may perceive an unpleasant jerk, jolt, or yank in a particular direction due to the rapid vehicle movement. However, if the vehicle 310 moves to follow the updated trajectory 330 too slowly, the vehicle 310 may be placed in danger of hitting another vehicle or veering off of the road 320. For example, in FIG. 3B, if the vehicle 310 does not change course to follow the trajectory 330 quickly enough at the curved portion 328, the vehicle 310 may pass into the right lane 324, which may lead to a collision with the vehicle 360.

To steer the vehicle 310 in a smooth yet efficient manner toward the trajectory 330, a new, transitional trajectory 350 for the vehicle 310 may be generated using an optimization method. In one example, a non-linear optimization problem may be created; to do so, the path 340 may first be represented within the computer system of the vehicle 310 as a curve in two-dimensional (2D) space. For example, the path 340 may be represented as a piecewise polynomial or as a clothoid spline. Other examples are also possible. The curve representing the path 340 may be defined by a number of vertices, and for each vertex, a function may be defined that depends on the distance of that vertex to the trajectory 330. Other functions may additionally be generated by the computer system of the vehicle 310 for the vertex that encode other constraints. For example, constraints that prevent too much deviation from the center of the lane may be provided. In other examples, constraints that avoid detected objects on the road 320 may be encoded in a function. The generated functions result in a non-linear optimization problem that is then solved by the computer system of the vehicle 310 for the best set of the vertices, which will define a transitional trajectory 350 for the vehicle 310.

The transitional trajectory 350 may be set to match the path 340 of the vehicle 310 up to a pre-determined distance d ahead of the vehicle 310, and then after the point d, the transitional trajectory 350 may become biased toward the trajectory 330, in accordance with the solution to the non-linear optimization problem. The transitional trajectory 350 may remain aligned with the path 340 up until the point d for the purpose of avoiding discontinuities in the input to the steering controller of the vehicle 310. Although the transitional trajectory 350 becomes increasingly biased toward the trajectory 330, the transitional trajectory 350 may or may not achieve eventual alignment with the trajectory 330. Whether the transitional trajectory 350 achieves alignment with the trajectory 330 may depend on how far the transitional trajectory 350 is from the trajectory 330 at the point d.

Figure 4:
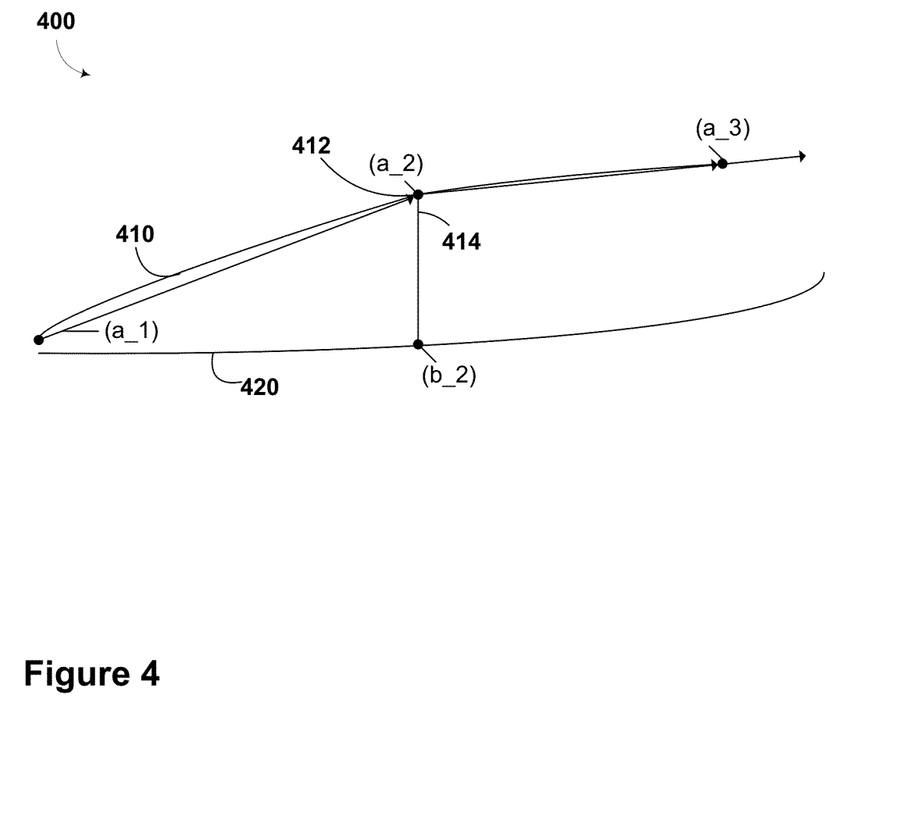
FIG. 4 is a schematic illustrating the generation of a new trajectory for an autonomous vehicle in accordance with an example embodiment.

FIG. 4 is a schematic 400 illustrating the generation of a new trajectory for an autonomous vehicle in accordance with an example embodiment. The example illustrated in FIG. 4 may be used to generate a trajectory such as the transitional trajectory 350 in the operating scenario described with reference to FIGS. 3A-B, for example.

A first trajectory 410 may be represented as a piecewise linear parametric curve including vertices (a_1, . . . a_n), and may represent a trajectory such as the path 340 as described with reference to FIGS. 3A-B. In one example, the first trajectory 410 may represent the route a vehicle is currently driving. In the example shown in FIG. 4, the first trajectory 410 is represented as piecewise linear with three vertices (a_1), (a_2), and (a_3) in 2D space. In other examples, any number of vertices may comprise a first trajectory. Each vertex may be defined by an origin 412 specific to the vertex and on the first trajectory 410.

In FIG. 4 a second trajectory 420 is also shown. The second trajectory 420 may represent the trajectory 330 described with reference to FIGS. 3A-B. The first trajectory 410 may be set to follow the second trajectory 420, as described with reference to FIG. 3A. A situation may occur that causes the second trajectory 420 to change its previously-set course, requiring the first trajectory 410 to change its course as well if it is desired that the first trajectory 410 continue to follow the second trajectory 420. This example scenario was described with reference to FIG. 3B.

An example of how to transition from the first trajectory 410 to the second trajectory 420 is shown in FIG. 4. A function may be defined that depends on a distance of a vertex on the first trajectory 410, such as vertex (a_2), to the second trajectory 420. The function may be a cost function. For example, for vertex (a_2), a closest point (b_2) may be located on the trajectory 420 and then a line 414 may be drawn passing through the origin 412 of (a_2) and through the closest point (b_2). The function may then be defined for the vertex (a_2) as a function of its position along the line 414. In one example, function takes the form of $k*(a\_2-b\_2)^2$, so that the function assigns a cost to vertex (a_2) based on its distance to point (b_2). Thus, a function such as the above-described function may be used as a criterion for moving the vehicle on the first trajectory 410 to or near the second trajectory 420.

Other functions may be constructed on the position of the vertex (a_2). The other functions may also be cost functions. The values associated with the cost may be positive values, in which case the cost function may seek to minimize the "cost." In another example, the values associated with the cost may be negative values, in which case the cost function may seek to maximize the negative "cost," or may refer to the values as benefits instead of costs and may seek to maximize the benefit. An example of another possible constraint includes a constraint not to deviate too far from the center of a lane, which may be represented using the function |a_2|<width_2, where width_2 is the max allowable deviation from the second trajectory 420. Another example of a possible constraint is to take into account other objects (for example, other vehicles) on or near the road to bias the new trajectory away from those objects. Still another example of a constraint is to construct a function that penalizes a non-smooth trajectory. In this example, a sum of squares of curvature at each vertex or a rate of change of curvature of the first trajectory 410 may be used. Still further examples of other cost functions may be used. Another example cost function may include repulsive potentials that push the new trajectory away from other obstacles on the road (e.g., guardrails or vehicles). Such an example cost function may depend on a variety of factors such as whether the obstacle is static or movable, the obstacle's proximity, size, the relative longitudinal speed between the vehicle and the obstacle (for example, so as to leave a bigger gap when passing or being passed at high relative speed), and the lateral speed of the obstacle. Still other factors for this cost function may be envisioned.

After establishing the desired functions to generate a new trajectory, a non-linear optimization problem may be solved for the best set of (a__1, . . . a_n) that defines the new, transitional trajectory.

The non-linear optimization problem may be solved efficiently in real-time. Generally, non-linear optimization problems are complex to compute; however, the non-linear optimization problem described above provides for solutions to be reached in a more efficient manner. This is in part due to the parametric representation of the first trajectory 410. The curvature of the first trajectory 410 around each vertex "i" may be estimated based on vertices "i−1," "i," and "i+1," in contrast to defining a curve parametrically in a manner in which each parameter affects the entire first trajectory 410.

The non-linear optimization problem may rely on an iterative computation of the function at different points in the search space and an estimate of the gradient, or derivative, of the function at those points. In one example, the optimization method may analytically compute the gradient as a function of the current state. This method lends itself to an analytically computable gradient, which is computationally efficient. Some example classes of algorithms that may be used are gradient descent and conjugate gradient optimization methods. Other algorithms may be envisioned as well.

Figure 5:
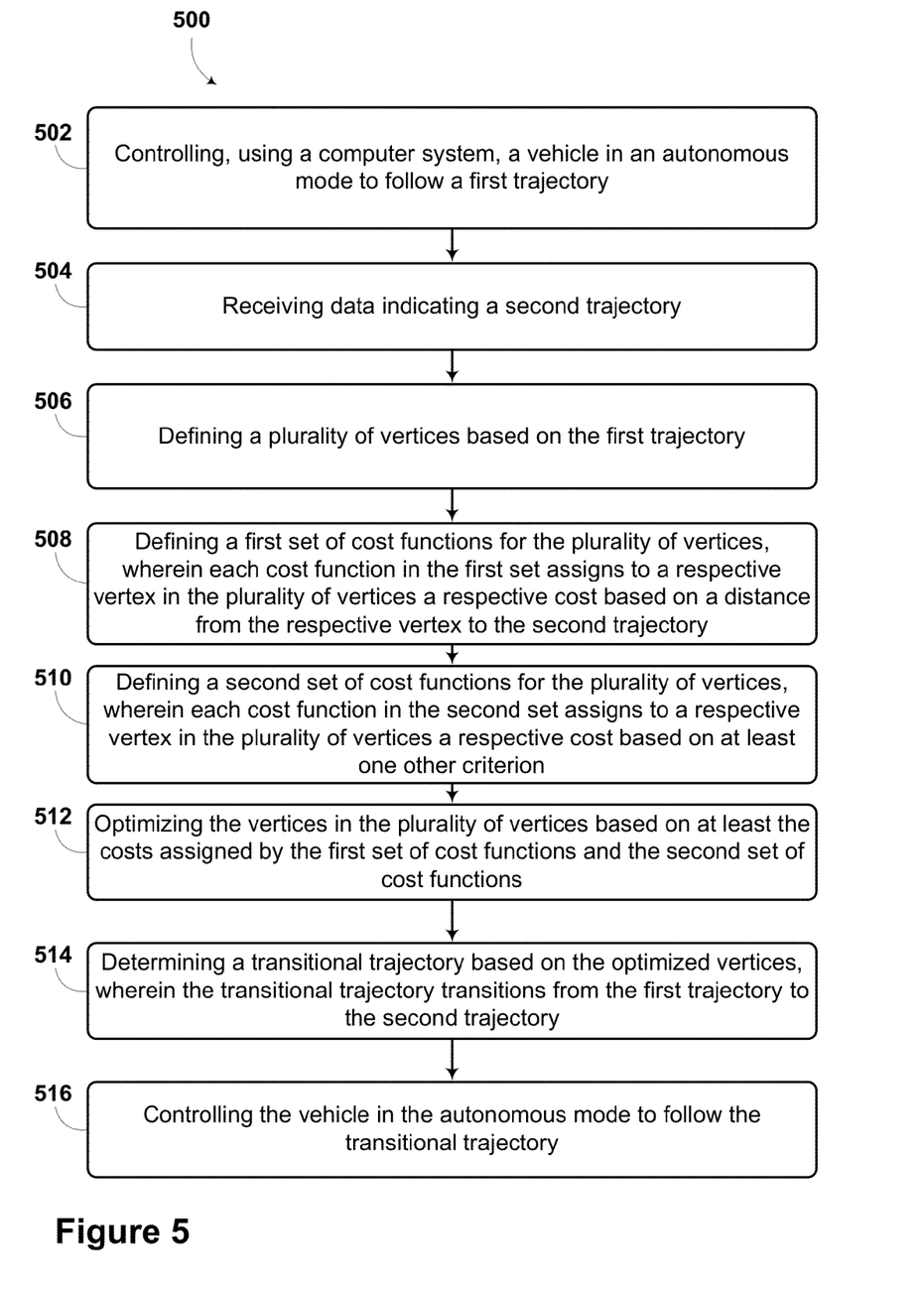
FIG. 5 is a flowchart of a process for providing an autonomous vehicle in accordance with an example embodiment.

FIG. 5 is a flowchart of a process for controlling an autonomous vehicle in accordance with an example embodiment. Method 500 shown in FIG. 5 presents an embodiment of a method that, for example, could be used with the vehicles 100, 200, and 310 described with reference to FIGS. 1-3B, respectively. Method 500 may include one or more operations, functions, or actions as illustrated by one or more of blocks 502-516. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments.

At block 502, the method includes controlling, using a computer system, a vehicle in an autonomous mode to follow a first trajectory. The computer system is configured to control a vehicle, such as the vehicles 100, 200, and 310 described with reference to FIGS. 1-3B, respectively, in an autonomous mode. The first trajectory may be a portion of the road on which the vehicle is currently driving. The first trajectory may be the path 330 or the first trajectory 410 described with reference to FIGS. 3A-4, respectively, in one example.

At block 504, the method includes receiving data indicating a second trajectory. The second trajectory may be a periodic input into the computer system and may indicate the latest estimate of the route the vehicle should follow. One or more sensors, such as the sensor system 104 described with reference to FIG. 1, may be configured to sense information about the road the vehicle is driving on, as well as the environment around the vehicle. The information gleaned from the sensors may be transmitted and used by a computer system to update the second trajectory. Other information, such as a map comprising roads for vehicle travel and/or other spatial references may be stored in memory and used to update the second trajectory as well. In another example, an external server may receive sensor data and/or map information, and generate the second trajectory which is then transmitted to the computer system of the vehicle.

At block 506, the method includes defining a plurality of vertices based on the first trajectory. A parametric curve may be generated as a piecewise linear curve with a number of vertices in 2D space and may be based on the first trajectory, as described with reference to FIGS. 3A-4.

At block 508, the method includes defining a first set of cost functions for the plurality of vertices, wherein each cost function in the first set assigns to a respective vertex in the plurality of vertices a respective cost based on a distance from the respective vertex to the second trajectory. A cost function may be defined that depends on a distance of a vertex on the first trajectory to the second trajectory. The cost function may be defined on the vertex as a smooth function of the first trajectory that reaches its minimum when the vertex on the first trajectory==a respective vertex to the second trajectory.

At block 510, the method includes defining a second set of cost functions for the plurality of vertices, wherein each cost function in the second set assigns to a respective vertex in the plurality of vertices a respective cost based on at least one other criterion. In one example, the one other criterion may encode a constraint on the vehicle movement. Possible constraints may include not deviating too far from the center of a lane, taking into account other objects on or near the road so as to bias the new trajectory away from those objects, and penalizing any movement that results in a non-smooth trajectory. Other example constraints may be envisioned. Functions encoding constraints may be generated to help ensure the vehicle moves smoothly as perceived by a vehicle passenger and/or carefully toward the second trajectory. Sensor data may be used to generate the constraints for the second function.

At block 512, the method includes optimizing the vertices in the plurality of vertices based on at least the costs assigned by the first set of cost functions and the second set of cost functions. Optimizing the vertices may include generating a non-linear optimization problem from the first and the second cost functions. In this manner, the first and the second sets of cost functions may be used in an optimization problem to achieve a transition toward the second trajectory that is quick, smooth, and safe for the vehicle passenger. The combination of the first and the second functions seeks to achieve this balance, and better mimic how a human driver would react to a change in a planned trajectory. Additional functions may be added as well to generate the optimization problem.

At block 514, the method includes determining a transitional trajectory based on the optimized vertices, wherein the transitional trajectory transitions from the first trajectory to the second trajectory. The optimization problem may be solved for the best set of points along the parametric curve representing the first trajectory to determine the transitional trajectory.

At block 516, the method includes controlling the vehicle in the autonomous mode to follow the transitional trajectory. The computer system uses the data indicating the transitional trajectory to drive the vehicle along the route of the transitional trajectory.

The vehicle and any on-board computer systems could control the vehicle in the autonomous mode. Alternatively, computer systems, such as a server network, could be used to control some or all of the functions of the vehicle in the autonomous mode.

Example methods, such as the method 500 of FIG. 5, may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 6:
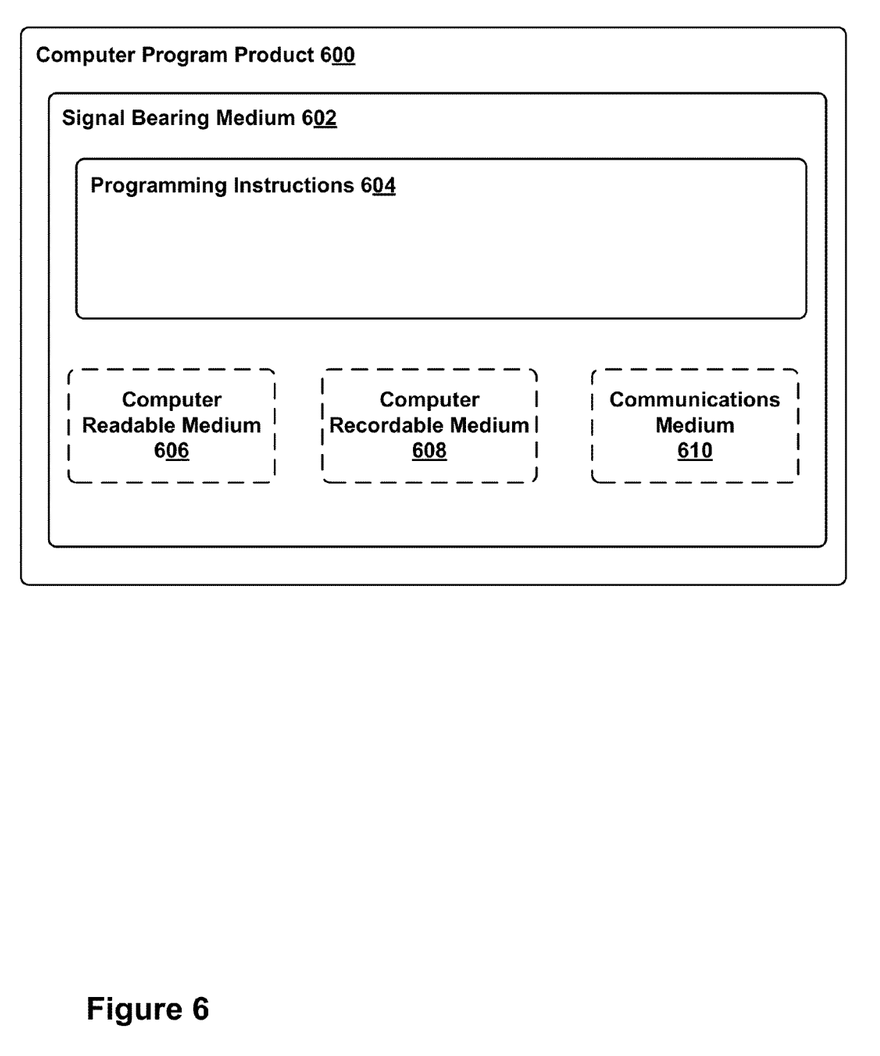
FIG. 6 is a schematic diagram of a computer program product in accordance with an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic diagram of a computer program product in accordance with an example embodiment. More specifically, FIG. 6 is a conceptual partial view of an example computer program product that includes a computer program for executing a computer process on a computer system.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:
1. A method, comprising:
controlling, using a computer system, a vehicle in an autonomous mode to follow a first trajectory, the first trajectory comprising a pre-determined path;
receiving data indicating a second trajectory;
defining a plurality of vertices based on the first trajectory;
defining a first set of cost functions for the plurality of vertices, wherein each cost function in the first set assigns to a respective vertex in the plurality of vertices a respective cost based on a distance from the respective vertex to the second trajectory;
defining a second set of cost functions for the plurality of vertices, wherein each cost function in the second set assigns to a respective vertex in the plurality of vertices a respective cost based on a distance from the respective vertex to an estimated center of a road lane on which the vehicle is currently traveling;

optimizing the location of the vertices in the plurality of vertices based on at least the costs assigned by the first set of cost functions and the second set of cost functions;

determining a transitional trajectory based on the optimized vertices, wherein the transitional trajectory transitions from the first trajectory to the second trajectory; and controlling the vehicle in the autonomous mode to follow the transitional trajectory.

2. The method of claim 1, wherein an indication of the estimated center of the road lane is received from at least one sensor.

3. The method of claim 1, wherein each cost function in the second set assigns to a respective vertex in the plurality of vertices a respective cost further based on a sum of squares of curvature for the vertex and is configured to penalize a non-smooth trajectory.

4. The method of claim 1, further comprising:

defining a third set of cost functions for the plurality of vertices, wherein each cost function in the third set assigns to a respective vertex in the plurality of vertices a respective cost based on at least one other criterion; and optimizing the vertices in the plurality of vertices based on at least the costs assigned by the first set of cost functions, the second set of cost functions, and the third set of cost functions.

5. The method of claim 1, wherein optimizing comprises generating a non-linear optimization problem.

6. The method of claim 5, wherein the non-linear optimization problem is a gradient descent algorithm.

7. The method of claim 5, wherein the non-linear optimization problem is a conjugate descent algorithm.

8. The method of claim 5, wherein the non-linear optimization problem comprises computing a gradient as a function of a current state of the vertex.

9. The method of claim 1, wherein the plurality of vertices form a piecewise linear parametric curve.

10. A vehicle, comprising:

a computer system configured to control the vehicle in an autonomous mode to follow a first trajectory, the first trajectory comprising a pre-determined path, receive data indicating a second trajectory, define a plurality of vertices based on the first trajectory, define a first set of cost functions for the plurality of vertices, wherein each cost function in the first set assigns to a respective vertex in the plurality of vertices a respective cost based on a distance from the respective vertex to the second trajectory, define a second set of cost functions for the plurality of vertices, wherein each cost function in the second set assigns to a respective vertex in the plurality of vertices a respective cost based on a distance from the respective vertex to an estimated center of a road lane on which the vehicle is traveling, optimize the vertices in the plurality of vertices based on at least the costs assigned by the first set of cost functions and the second set of cost functions, determine a transitional trajectory based on the optimized vertices, wherein the transitional trajectory transitions from the first trajectory to the second trajectory, and control the vehicle in the autonomous mode to follow the transitional trajectory.

11. The vehicle of claim 10, wherein an indication of the estimated center of the road lane is received from at least one sensor.

12. The vehicle of claim 10, wherein each cost function in the second set assigns to a respective vertex in the plurality of vertices a respective cost further based on a sum of squares of curvature for the vertex and is configured to penalize a non-smooth trajectory.

13. The vehicle of claim 10, wherein the computer system is further configured to generate a non-linear optimization problem.

14. The vehicle of claim 13, wherein the non-linear optimization problem is a gradient descent algorithm.

15. The vehicle of claim 13, wherein the non-linear optimization problem is a conjugate descent algorithm.

16. The vehicle of claim 13, wherein the non-linear optimization problem comprises computing a gradient as a function of a current state of the vertex.

17. A non-transitory computer readable medium having stored therein instructions executable by a computer system to cause the computer system to perform functions, the functions comprising:

controlling a vehicle in an autonomous mode to follow a first trajectory, the first trajectory comprising a pre-determined path;

receiving data indicating a second trajectory;

defining a plurality of vertices based on the first trajectory;

defining a first set of cost functions for the plurality of vertices, wherein each cost function in the first set assigns to a respective vertex in the plurality of vertices a respective cost based on a distance from the respective vertex to the second trajectory;

defining a second set of cost functions for the plurality of vertices, wherein each cost function in the second set assigns to a respective vertex in the plurality of vertices a respective cost based on a distance from the respective vertex to an estimated center of a road lane on which the vehicle is currently traveling;

optimizing the vertices in the plurality of vertices based on at least the costs assigned by the first set of cost functions and the second set of cost functions;

determining a transitional trajectory based on the optimized vertices, wherein the transitional trajectory transitions from the first trajectory to the second trajectory; and controlling the vehicle in the autonomous mode to follow the transitional trajectory.

18. The non-transitory computer readable medium of claim 17 wherein the instructions are executable to define a third set of cost functions for the plurality of vertices, wherein each cost function in the third set assigns to a respective vertex in the plurality of vertices a respective cost based on at least one other criterion and to optimize the vertices in the plurality of vertices based on at least the costs assigned by the first set of cost functions, the second set of cost functions, and the third set of cost functions.

* * * * *